(12) United States Patent
Martin

(10) Patent No.: US 7,534,367 B2
(45) Date of Patent: *May 19, 2009

(54) STABLE OXIDIZER COMPOSITION FOR USE IN FORMULATIONS

(75) Inventor: Perry L. Martin, Yuba City, CA (US)

(73) Assignee: Truox, Inc., McClellan, CA (US)

( * ) Notice: Subject to any disclaimer, the term of this patent is extended or adjusted under 35 U.S.C. 154(b) by 493 days.

This patent is subject to a terminal disclaimer.

(21) Appl. No.: 10/878,174

(22) Filed: Jun. 28, 2004

(65) Prior Publication Data

US 2005/0288202 A1 Dec. 29, 2005

(51) Int. Cl.
*C01B 15/08* (2006.01)
*C01B 15/06* (2006.01)
*C02F 1/72* (2006.01)
*C11D 17/00* (2006.01)
*C11D 7/18* (2006.01)
*C11D 7/38* (2006.01)

(52) U.S. Cl. .......................... 252/186.27; 252/186.21; 252/186.25; 252/186.29; 252/186.34; 210/754; 210/756; 422/241

(58) Field of Classification Search ............ 252/183.12, 252/183.13, 186.25
See application file for complete search history.

(56) References Cited

U.S. PATENT DOCUMENTS

| | | | | |
|---|---|---|---|---|
| 5,139,763 A * | 8/1992 | Amini | ........................ | 423/513 |
| 5,194,176 A | 3/1993 | Copenhafer et al. | .... | 252/186.27 |
| 5,525,121 A * | 6/1996 | Heffner et al. | ................ | 8/111 |
| 5,607,656 A * | 3/1997 | Soicke et al. | ................ | 423/513 |
| 5,755,993 A * | 5/1998 | Heffner et al. | ......... | 252/186.39 |
| 6,221,826 B1 | 4/2001 | Surutzidis et al. | ........... | 510/349 |
| 6,878,289 B2 * | 4/2005 | Martin | ...................... | 210/759 |
| 7,344,656 B2 * | 3/2008 | Martin | .................. | 252/186.26 |
| 2002/0004473 A1 * | 1/2002 | Busch et al. | ................ | 510/302 |
| 2003/0045747 A1 * | 3/2003 | Wurziger et al. | ............ | 562/418 |
| 2005/0261138 A1 * | 11/2005 | Robb et al. | ................. | 507/209 |

* cited by examiner

*Primary Examiner*—Joseph D Anthony

(57) ABSTRACT

A method of treating a peroxygen compound (e.g., potassium monopersulfate) for use in applications where controlled release rate, exposure to incompatible compounds, and/or moisture is presented. The method incorporates coating the peroxygen compound with one or more of the following polymers: 1) chitin/chitosan, 2) carboxylate/sulfonate copolymer or tertiary polymer, and 3) carboxylate polymer selected from polymaleic acid, polyepoxysuccinic acid and/or phosphinocarboxylate polymers. Optionally, the peroxygen compound is also coated with an inorganic salt layer and a silicate layer. Potassium monopersulfate coated with an organic polymer is useful in reduced allergenic formulations and as an anti-caking agent. When the organic polymer is a polysaccharide, the coated potassium monopersulfate is also effective for shock treatment of water systems (e.g., pools). The oxidizing composition prepared with this method has a prolonged shelf life while demonstrating good solubility during use.

44 Claims, 13 Drawing Sheets

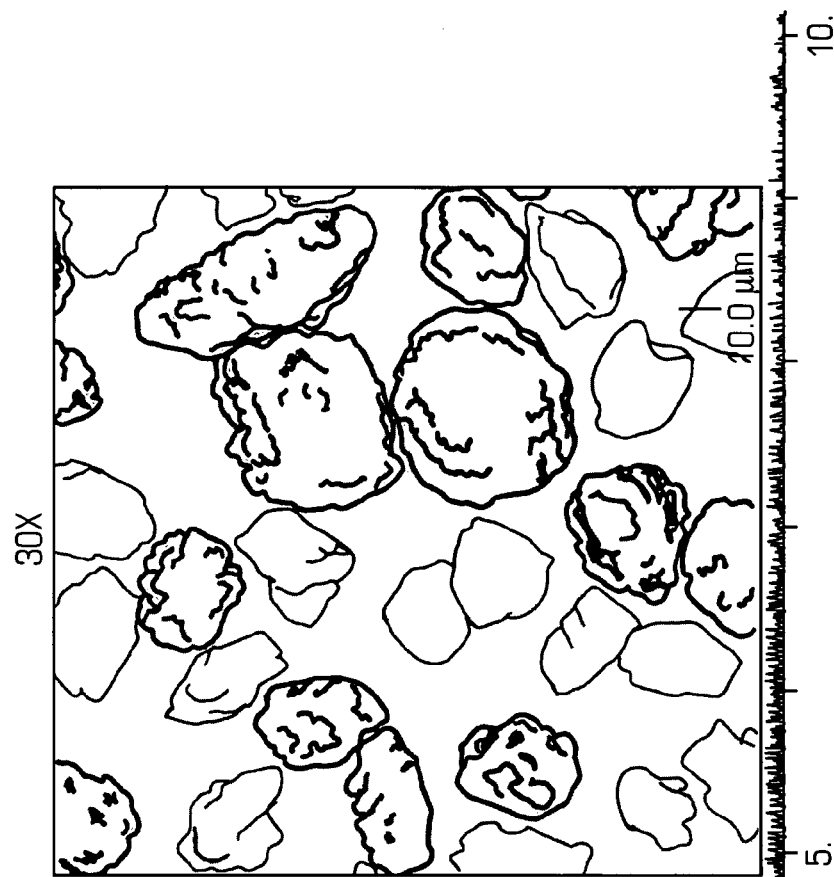
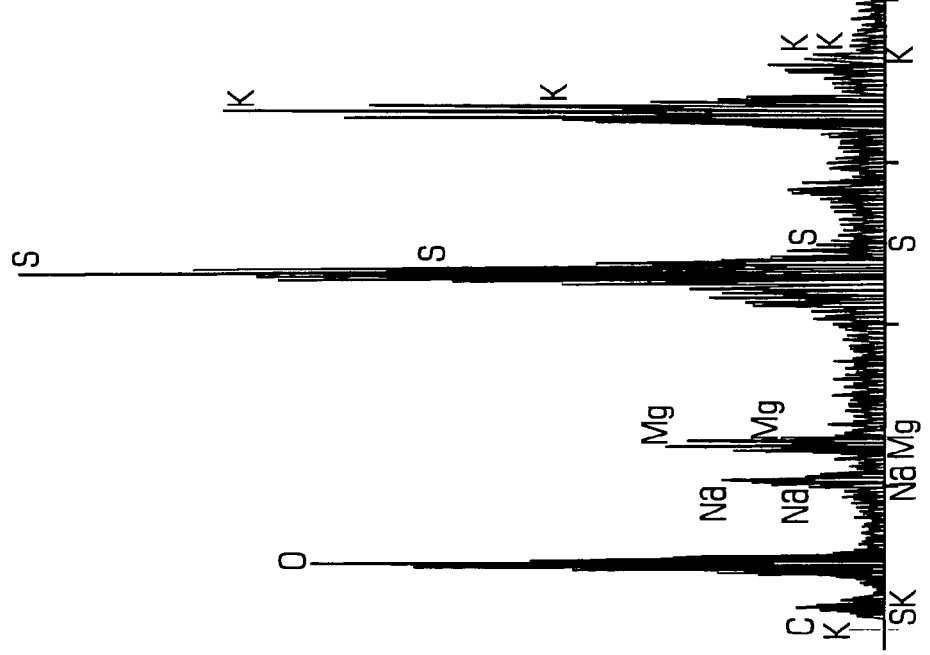
FIG. 8B
FIG. 8A

300X

1000X

1000X

300X

STABLE OXIDIZER COMPOSITION FOR USE IN FORMULATIONS

FIELD OF INVENTION

The invention relates generally to an oxidizing composition and particularly to oxidizing composition stable enough to be used in formulations.

BACKGROUND

Peroxygen compounds are useful in many applications that require enhanced oxidation. The effectiveness of peroxygen compounds as oxidizers depend partly on their rate of decomposition, which in turn depends on environmental factors. For example, if the environment contains elements that increase the decomposition rate of peroxygen compounds such as high humidity, mixing, and exposure to incompatible chemicals, the effectiveness of the peroxygen compounds is compromised.

Potassium monopersulfate (PMPS) is a peroxygen compound that is recognized for its high oxidizing potential. PMPS effectivey oxidizes organics even when other peroxygen compounds, such as hydrogen peroxide, are either less effective or not effective at all. For example, PMPS is capable of oxidizing complex organics such as lignin and tannin in paper and stains/dyes in clothes, neither of which is easily removable with hydrogen peroxide.

PMPS has the ability to convert halogens such as chloride ions into sanitizers such as chlorine gas, hypochlorous acid, and hypochorite ions. Thus, PMPS is often applied in conjunction with halogen donors and/or other oxidizers to achieve optimal effect.

While PMPS is a very desirable oxidizer with a broad range of beneficial applications, its use is either limited or altogether restricted due to the presence of impurities such as the harsh irritant potassium oxodisulfate ($K_2S_2O_8$), also commonly referred to as potassium persulfate. Numerous medical and dermatological studies have documented the effects of K2S2O8 resulting from direct or indirect contact with the irritant. For example, irritation associated with residual K2S2O8 on dentures has been linked to allergic reactions and oral discomfort. Hair loss and severe dermatitis of the scalp have occurred from contact with oxodisulfate present in hair dyes. A wide range of medical symptoms have been directly linked to airborne inhalation as well as direct and indirect (residual) contact from agents containing oxodisulfate. Bathers have reported rash formation and, in some cases, severe lesions as a result of bathing in swimming pools where products containing oxodisulfate had been used. More details regarding effects of oxodisufate are documented in the following references:

Le Coz C J, Bezard M., "Allergic contact cheilitis due to effervescent dental cleanser: combined responsibilities of the allergen persulfate and prosthesis porosity." *Contact Dermatitis*, Vol. 41(5): 268-71 (November 1999). Consultation de Dermato-Allergologie, Clinique Dermatologique des Hopitaux Universitaires de Strasbourg 1, France.

Yawalkar N, Helbling A, et al., "T cell involvement in persulfate triggered occupational contact dermatitis and asthma." *Ann Allergy Asthma Immunol.*, Vol. 82(4):401-4 (April 1999), Institute of Immunology and Allergology, University of Bern, Inselspital, Switzerland.

"Contact urticaria due to potassium persulfate," *Contact Dermatitis*, 2001 September 45(3):177. PMID: 11553153 [PubMed—indexed for MEDLINE]

PMPS formulations have also been limited in their application due to its instability and/or reactivity with other compounds such as moisture, organics, halogens and the like, encountered when formulated with various compounds and/or exposed to various environments.

Thus, in order to effectively exploit the oxidizing power of a peroxygen compound, the chemistry of the peroxygen compound and the elements it would be exposed to in a particular application must be carefully considered. The peroxygen compound's rate of dissolution, the level of humidity in the environment, and the peroxygen compound's incompatibility with certain substances (e.g., alkali versus acid) are among some of the factors to be considered. Considering these factors, a coating is sometimes used with the PMPS. The coating itself must be compatible with the PMPS composition and have preferably hypoallergenic characteristics to enhance the utility of PMPS.

One way to lower the effects of peroxygen compounds' sensitivity involves coating or treating the compound to shield it from elements that cause its decomposition. For example, sodium percarbonate and sodium perborate are sometimes treated with coatings to enhance their utility.

Particles of peroxygen compounds may be coated with various substances, some of which include trona (U.S. Pat. No. 4,105,827), sodium silicate (U.S. Pat. No. 3,951,838), sodium perborate plus sodium silicate (U.S. Pat. No. 4,194, 025), boric acid (U.S. Pat. No. 4,321,301), wax (U.S. Pat. No. 4,421,669), a polymer latex (U.S. Pat. No. 4,759,956), sodium silicate plus a chelate (U.S. Pat. No. 4,126, 717), sodium borosilicate (U.S. Pat. No. 5,194,176). Generally, these treatments show some improvement in stability in a humid environment of alkaline percarbonates and perborates. In general, these coating processes are based on either 1) physically coating the sodium percarbonate with a compound such as trona, boric acid, and the like to act as a spacer and prevent the percarbonate from physically contacting the other compounds in the detergent composition, or 2) coating the peroxygen compound with a vapor barrier such as a wax or a polymer.

However, none of these coating materials have successfully stabilized the peroxide compound because it is usually a matter of time until water vapor penetrates the physical barrier and initiates decomposition. If a vapor-impervious barrier is used, the rate of dissolution of the peroxide particle is retarded so much so that the compound is no longer useful.

What is desired is a method of coating a peroxygen compound so that it does not decompose before use but in a way that the coating does not interfere with the effect of the peroxygen compound during use.

SUMMARY

The present invention provides a method of preparing an oxidizing composition, such as a potassium monopersulfate (PMPS) composition. The PMPS composition of the invention uses an organic polymer coating (e.g., a polysaccharide coating) to reduce the allergenic activity of the oxidizing composition so that it can be used in applications where it will come into direct or indirect contact with human beings and animals. The composition of the invention is also useful as anti-caking agents and numerous other applications such as laundry detergent. A PMPS composition that is coated with the organic polymer layer shows improved moisture resistance and stability compared to bare PMPS.

In one aspect, the invention is a stable oxidizer composition for use in formulations. The composition includes an oxidizing particle and an organic polymer layer deposited on the oxidizing particle. Optionally, an inorganic salt layer may be deposited between the oxidizing particle and the organic polymer layer.

In another aspect, the invention is a method of preparing an oxidizing composition by providing an oxidizing particle that includes one of a peroxygen compound and a halogen, and depositing an organic polymer layer on the oxidizing particle.

In yet another aspect, the invention is reduced allergenic potassium monopersulfate composition including a potassium monopersulfate particle and a polysaccharide layer deposited on the potassium monopersulfate particle.

A fourth aspect of the invention is a method of making a reduced allergenic potassium monopersulfate composition. The method entails preparing a polysaccharide solution and applying the polysaccharide solution to a potassium monopersulfate particle having K2S2O8 in an amount that is less than about 0.5 wt. % of the potassium monopersulfate particle.

A fifth aspect of the invention is a method of reducing the chemical oxygen demand in a water system by shock treatment. The method includes obtaining a potassium monopersulfate composition including a potassium monopersulfate core and a polysaccharide coating, and periodically adding a predetermined amount of the potassium monopersulfate composition to the water system.

BRIEF DESCRIPTION OF THE DRAWINGS

FIGS. 8A and 8B are a scanning electron microscope (SEM) image of PMPS triple salt coated with $MgCO_3$ and the analysis result of the image.

DETAILED DESCRIPTION OF THE PREFERRED EMBODIMENT(S)

Figure 1:
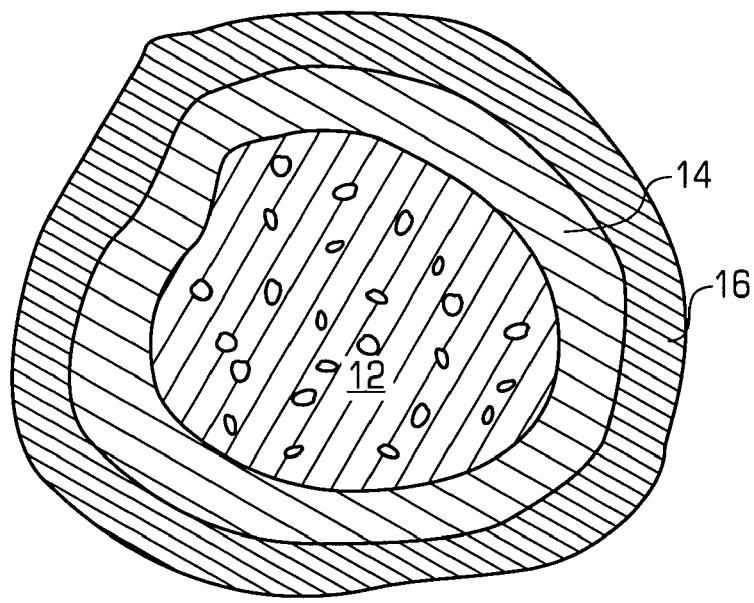
FIG. 1 is an oxidizing composition including an oxidizing particle coated with an inorganic salt layer and an organic polymer layer.

The invention is a method of preparing a stable peroxygen compound that is suitable for being used in formulations and the peroxygen composition produced with the method. Although the embodiments described herein use potassium monopersulfate as the exemplary peroxygen compound, the invention is not so limited and may be adapted to other types of peroxygen compounds. Likewise, although the embodiments described herein use only a few different types of organic polymer materials, other types of organic polymer materials may be used.

As used herein, a first material or layer being deposited "on" a second material is intended to include both the case where the first material is directly in contact with the second material and the case where there are intervening layers between the first material and the second material. A "reduced allergenic" formulation is a formulation that is unlikely to cause or induce allergic reactions among mammals that come into contact with the formulation.

In accordance with the invention, an oxidizing particle (e.g., a potassium monopersulfate particle) is stabilized by being coated with an inorganic salt layer and at least one organic polymer. The organic polymer layer may be a polysaccharide, such as chitin or a derivative thereof (e.g., chitosan). In a first embodiment, the stable oxidizing composition includes a potassium monopersulfate particle coated with an inorganic salt and chitin or its derivative. In a second embodiment, the composition includes an inorganic salt layer, a silicate layer, and a polymer layer that contains either chitin or its derivative. In a third embodiment, the composition includes an inorganic salt layer, a silicate-polymer layer that contains a mixture of a silicate component and a polymer component, and an organic polymer layer. In a fourth embodiment, the composition includes an inorganic salt layer, a first polymer layer, and a second polymer layer. Although other embodiments are possible, only four embodiments are presented herein because other embodiments should be apparently to a person of ordinary skill in the art based on these four embodiments.

The potassium monopersulfate ($KHSO_5$) that is used in the invention preferably has a K/S ratio between about 1.0 and about 1.25, inclusive. Potassium monopersulfate usually exists in the form of a triple salt having the formula $2KHSO_5 \cdot KHSO_4 \cdot K_2SO_4$. The weight fractions of the three salts vary, and the triple salt used in the invention preferably has a $KHSO_5$ weight fraction of between about 43% to about 75%. Many potassium monopersulfate triple salts contain $K_2S_2O_8$ (potassium oxodisulfate) as a byproduct. The invention works with potassium monopersulfate that does not contain 43-75% $KHSO_5$; however, these criteria are presented because useful results have been achieved using these criteria.

Methods of producing potassium monopersulfate are well known. Typically, PMPS triple salt is produced from Caro's acid ($H_2SO_5$, also called peroxymonosulphuric acid), which in turn is usually produced by reacting $H_2SO_4$ with $H_2O_2$. The $H_2SO_4$ may be reacted with $H_2O_2$ in a single-stage reactor of the type described in U.S. patent application Ser. No. 10/878, 898, which is incorporated herein by reference. Caro's acid is an equilibrium product between these reactants on one hand and $H_2SO_5$ and $H_2O$ on the other, as shown by the following reaction:

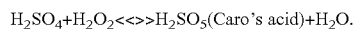
$$H_2SO_4+H_2O_2 \leftrightarrow H_2SO_5(\text{Caro's acid})+H_2O.$$

The Caro's acid is partially neutralized with alkali potassium salts such as $KHCO_3$, $K_2CO_3$, and/or KOH to generate $KHSO_5$ according to the following reaction:

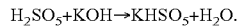
$$H_2SO_5+KOH \rightarrow KHSO_5+H_2O.$$

Then, the partially neutralized Caro's acid is evaporated to a viscous slurry and dried using a vacuum evaporation technique or a fluidized drier to produce a stable, nonhygroscopic triple salt.

Optionally, the viscous slurry containing PMPS may be treated with alkali magnesium salts (e.g., 2-wt. % magnesium carbonate hydroxide pentahydrate) before being subjected to vacuum evaporation. Where an alkali magnesium salt is used, the salt is added to the process solutions during the manufacture of potassium monopersulfate to control the K/S ratio. As a result, potassium monopersulfate triple salts sometimes include some level of alkali magnesium salt. The alkali magnesium salt, which may be one or more of $Mg(OH)_2$, $MgCO_3$, $Mg(HCO_3)_2$, MgO, $(MgCO_3)_4$—$Mg(OH)_2$-$5H_2O$, $CaMg(CO_3)_2$, MgO—CaO, and $Ca(OH)_2$—MgO, preferably makes up no more than 10 wt. % of the potassium monopersulfate triple salt.

Using the method described above, starting with an 80 wt. % H2O2 and 99.36 wt. % H2SO4, a potassium monopersulfate triple salt having an active oxygen content of 6.45% is formed. The potassium monopersulfate triple salt is coated with chitosan by atomizing a 2-wt. % solution of chitosan dissolved in a solvent, which may be a dilute acetic acid solution. The triple salt is fluidized in a fluidized drier to which the chitosan solution was atomized and directed countercurrent to the flow of air through the drier. The type of solvent that is used may be adjusted depending on the type of organic polymer that is being used for coating.

Optionally, an inorganic salt layer is deposited on the oxidizing particle before the silicate and/or organic polymer layers. The inorganic salt layer may contain a salt that is a silicate, carbonate, sulfate, borate, phosphate, hydroxide, or oxide of sodium, potassium, lithium, calcium, magnesium, or boric acid. The inorganic salt layer is useful for distributing subsequent coatings, balancing the pH of the final composition, and altering the dissolution rate of the final composition by distorting the polymer structure of the polymer layer that is applied thereon. The effect on the dissolution rate of the final composition is especially important if the final composition is to be used in an application that requires dissolution, such as a laundry detergent. Sometimes, the inorganic salt also enhances the stability and applicability of the resulting composition.

An organic polymer layer is coated on the inorganic salt layer. The organic polymer layer may contain one or more polysaccharides such as cellulose, dextran, pectin, alginic acid, agar, agarose, carragenans, chitin and chitosan. The chitin or chitosan may be selected from its family of derivatives. The selection of a particular material depends on the desired level of protective coating and the exact application. The chitin/chitosan may also be combined with various organic acids having 1-10 carbons and one or more carboxylic acid functionality. Organic acids or solvents that may be used with the chitin/chitosan include but are not limited to formic acid, acetic acid, succinic acid, malonic acid, lactic acid, citric acid. Mineral acids or their donors, including sulfuric, hydrochloric, and phosphoric acids, may also be combined with the chitin/chitosan. Sulfamic and sulfonic acids and their many derivatives may also be useful.

The organic polymer layer is preferably applied as a liquid, gel, or foam to a potassium monopersulfate particle that is coated with an inorganic salt layer. Chitin can be dissolved using combinations of: N,N, dimethylacetamide, N-methyl-2-pyrrolidone, and lithium chloride. The polymer layer may be applied with a fluidized bed, rotary drum, mixing conveyer or the like where effective distribution across the potassium monopersulfate particle surface is induced by applying a liquid, or foam containing the disclosed polymer. In the case of spraying a liquid version of the disclosed polymer, an atomizing spray is preferred. Both foam and spray applications of the polymer preferably utilize inert gas such as air to apply the polymer to the potassium monopersulfate particle.

The coating layers may be deposited using any suitable conventional means including but not limited to a sprayer, a fluidized bed, a rotary drum, and a mixing conveyor.

The coated particles are dried and packaged, preferably at a temperature no higher than 90° C. The final composition will contain about 0.1 to 10 wt. % chitin/chitosan polymer. In embodiments that include multiple layers, the drying process may be performed after the deposition of each layer. However, if precautions are taken to keep the different layers from mixing, only one drying step is needed for each particle. For example, if a waiting period is built into the process between successive depositions so that each layer is allowed to dry to a certain degree before the next layer is deposited, one final drying step after deposition of the last layer is sufficient.

Some polysaccharides such as chitosan exhibit hypoallergenic characteristics. In addition to being hypoallergenic, chitosan-based polymers make an effective coagulating/flocculating agent whose solubility increases in acidic conditions, and act as an anti-caking agent. Due to these properties, chitosan-based polymers are useful in various personal care products, acid based formulations, and formulations where coagulation of decomposition catalyst (e.g., metals and precipitation of suspended particles) is desired.

Furthermore, it has been discovered that polysaccharide-coated peroxygen compounds, such as polysaccharide-coated potassium monopersulfate, are useful for treating water systems. To ensure that the water systems such as swimming pools, hot tubs, and spas are enjoyed safely, water is treated to reduce or eliminate chemical oxygen demands (COD) and/or total organic carbon (TOC) in the water. When treating water systems with potassium monopersulfate, a high concentration of potassium monopersulfate is added to the water to "shock" treat the water. Currently, the potassium monopersulfate that is used for shock treatment is not coated with a polysaccharide. However, as will be shown below, shock treatment with potassium monopersulfate is more effective when the potassium monopersulfate is polysaccharide-coated.

Embodiment 1

FIG. 1 is a cross-sectional view of an oxidizing composition 10 that includes an oxidizing particle 12, such as a potassium monopersulfate particle, coated with an inorganic salt layer 14 and a polymer layer 16 in the manners described above. The inorganic salt layer 14 may be omitted in variations of Embodiment 1.

Embodiment 2

Figure 2:
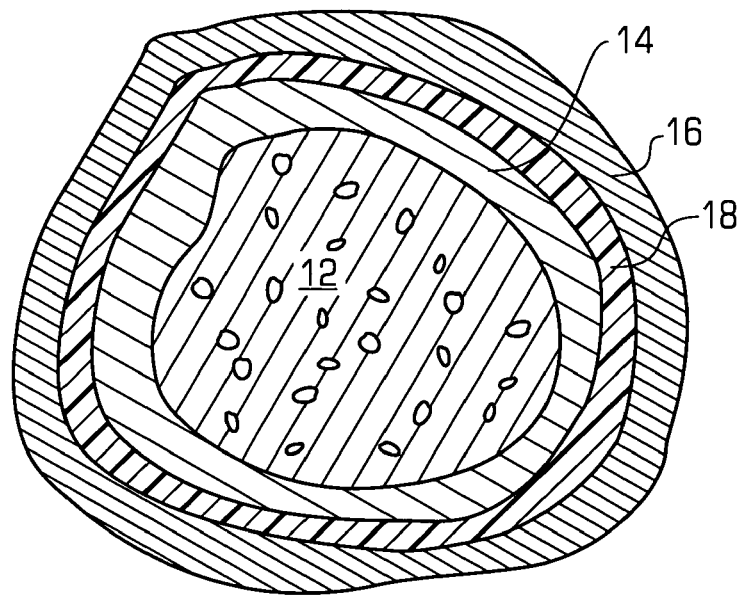
FIG. 2 is an oxidizing composition including an oxidizing particle coated with an inorganic salt layer, a silicate layer, and an organic polymer layer.

FIG. 2 is a cross-sectional view of an oxidizing composition 30 that includes the oxidizing particle 12 coated with the inorganic salt layer 14, a silicate layer 18, and the polymer layer 16. The silicate layer 18, which is positioned between the inorganic salt layer 14 and the polymer layer 16, provides additional control of dissolution rates and extra protection against vapor, and is applied prior to the addition of the final polymer layer. The silicate layer 18 may be replaced with or supplemented with a borosilicate layer. The silicate layer 18 may contain sodium, potassium, lithium, magnesium, calcium silicate, alkyl silicate, calcium borosilicate, alkyl borosilicate, silicic acid, or a combination thereof.

The silicate layer 18 may be applied in the form of a slurry, liquid, or foam during mixing in a conveyer, rotary mixer/dryer, fluidized mixer/dryer or the like.

Embodiment 3

Figure 3:
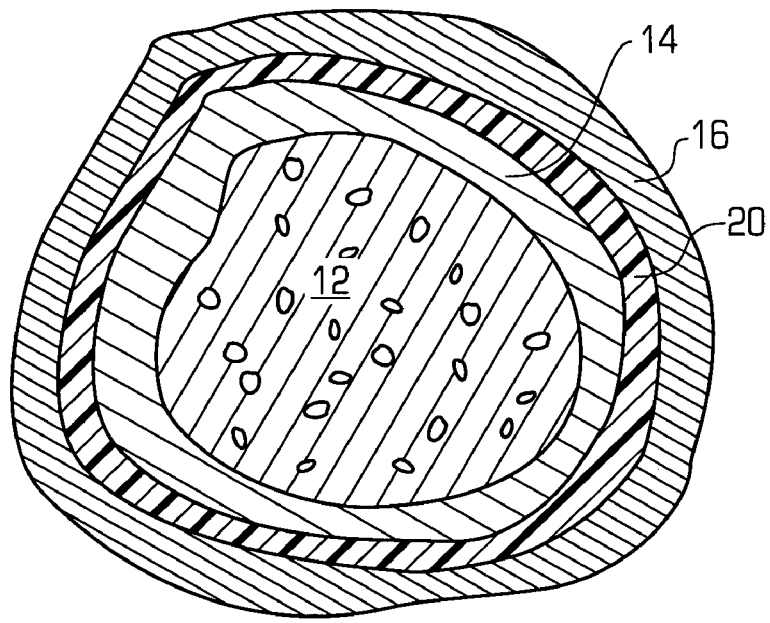
FIG. 3 is an oxidizing composition including an oxidizing particle coated with an inorganic salt layer, a silicate-polymer layer, and an organic polymer layer.

FIG. 3 is a cross-sectional view of an oxidizing composition 40 including the oxidizing particle 12 (e.g., potassium monopersulfate particle) coated with the inorganic salt layer 14, a silicate-polymer layer 20, and the organic polymer layer 16. The silicate-polymer layer 20 contains a polymer component and a silicate component. Unlike in Embodiment 2, where the silicate material and the polymer material are coated as two separate layers, the silicate material and the polymer material are premixed and coated as a single silicate-polymer layer 20 in Embodiment 3. The organic polymer layer 16 is a separate layer from the silicate-polymer layer 20.

The silicate component of the silicate-polymer layer 20 may contain sodium silicate, potassium silicate, lithium silicate, magnesium silicate, calcium silicate, alkyl silicate, calcium borosilicate, alky borosilicate, and silicic acid, or any combination thereof. The polymer component of the silicate-polymer layer may be a copolymer or tertiary polymer. The tertiary polymer may contain a nonionic component, such as methacrylamide, substituted methacrylamide, vinyl alcohol, allyl alcohol, vinyl esters, an ester of vinyl or allyl alcohol, styrene, isobutylene, and diisobutylene. The copolymer or tertiary polymer has a carboxylate component or a sulfonate component. The carboxylate component may be derived from polyacrylic acid, polymethacrylic acid, or polymaleic acid. The sulfonate component may be derived from methacrylamido methyl propane sulfonic acid and styrene sulfonic acid.

The silicate-polymer layer enhances the dissolution rate of the silicate or borosilicate and improves its distribution by enhancing dispersion and/or foam formation.

The copolymer/tertiary polymer is mixed with the silicate mixture prior application on the inorganic salt layer 14. In more detail, a solution of colloidal or liquid silica is combined with a polymer selected from either a carboxylate/sulfonate copolymer or tertiary polymer. The silica is a colloidal suspension or soluble solution with a pH ranging from 3-14 where the silicate is derived from sodium silicate, potassium silicate, lithium silicate, alkyl silicate, magnesium silicate and/or calcium silicate. The polymer and silica solution are applied to the oxidizing particle 12 using a spray, a foam-in a fluidized bed, a rotary drum, a mixing conveyer, or any other conventional and suitable means of coating.

Carboxylate/sulfonate copolymer and tertiary polymers are effective silicate dispersants that effectively enhance distribution of silicate based coatings, thereby inducing the formation of a uniform barrier film comprised predominantly of silicate compounds. Also, these copolymers and tertiary polymers improve the dissolution rate of the coated peroxygen compound by dispersing the barrier film when diluted in an aqueous solution.

Embodiment 4

Figure 4:
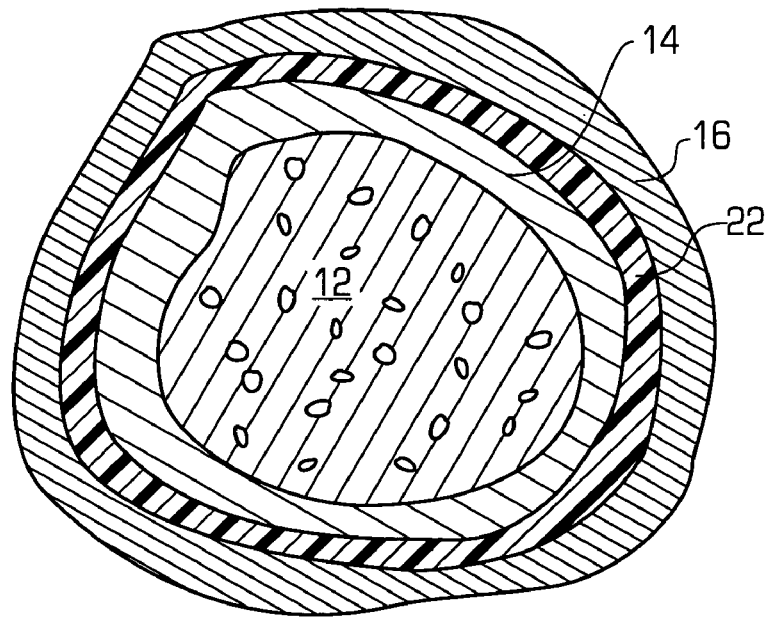
FIG. 4 is an oxidizing composition including an oxidizing particle coated with an inorganic salt layer, a first polymer layer, and a second polymer layer.

FIG. 4 is a cross-sectional view of an oxidizing composition 50 including an oxidizing particle 12 coated with an inorganic salt layer 14, a first polymer layer 22, and a second polymer layer 16. The first polymer layer 22 contains a polymer that is effective at dispersing and chelating, such as polymaleic acid, phosphinocarboxylic acid, polycarboxylic acid, polyepoxysuccinic acid, polycarboxylic acid, and polyacrylic acid. In addition, this first polymer layer 22 may also contain hydrogen, sodium, potassium, lithium, calcium, or magnesium.

The second polymer layer 16 is similar to the organic polymer layer 16 in Embodiment 1. The second polymer layer 16 may contain one or more polysaccharides such as cellulose, dextran, pectin, alginic acid, agar, agarose, carragenans, chitin and chitosan. The chitin or chitosan may be selected from its family of derivatives.

Polymaleic acid, polyepoxysuccinic acid and phosphinocarboxylate polymers can be applied either alone or in combination with one or more inorganic polyvalent cationic salts, thereby enhancing formation of a uniform barrier film. Upon application in an aqueous solution, the polymers enhance diffusion of the inorganic components of the barrier film and reduce the potential for undesirable effects induced by the presence of polyvalent cationic ions, such as scale formation and inactivation of detergents.

For certain applications where the oxidizing composition of the invention directly or indirectly comes into contact with people or pets, it is desirable to use an oxidizing particle that contains a low level of $K_2S_2O_8$. Preferably, the concentration of $K_2S_2O_8$ is kept at a level no higher than 0.5 wt. % of the triple salt, and more preferably at a level no higher than 0.2 wt. % of the triple salt.

An exemplary method of producing potassium monopersulfate that is suitable for this invention is provided in U.S. Provisional Patent Application Ser. No. 60/505,466 filed on Sep. 23, 2003 and U.S. patent application Ser. No. 10/878,898, which are incorporated by reference herein in their entirety. U.S. Pat. No. 4,579,725 discloses a method of producing potassium monopersulfate using oleum instead of H2SO4.

Figure 5:
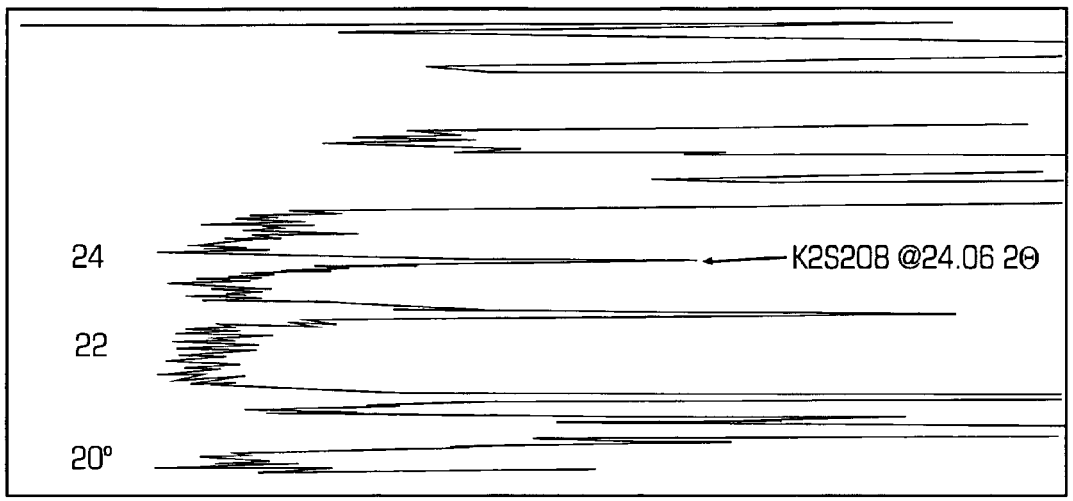
FIG. 5 is an X-Ray Diffraction Spectroscopy result of a potassium oxodisulfate sample showing the characteristic peak at 24.06 degrees 2θ.

FIG. 5 is an X-Ray Diffraction Spectroscopy result of a sample of potassium persulfate (also called potassium oxodisulfate, $K_2S_2O_8$), whereby a signature peak specific to $K_2S_2O_8$ is indicated at about 24.06 degrees $\theta$.

Figure 6:
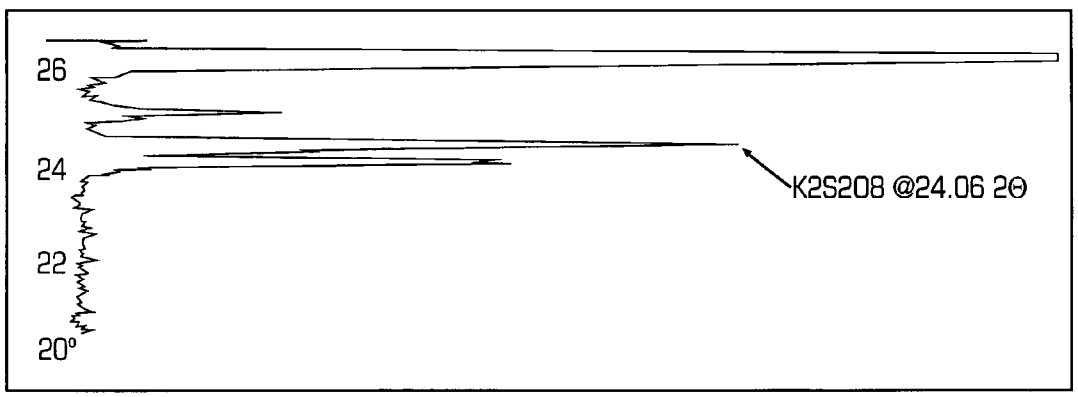
FIG. 6 is an X-Ray Diffraction Spectroscopy result of the commercially available Oxone® potassium monopersulfate triple salt.

FIG. 6 is an X-Ray Diffraction Spectroscopy result of a sample of commercially available triple salt sold under the brand name Oxone® by E.I. DuPont. The signature peak for $K_2S_2O_8$ is indicated in FIG. 6.

Figure 7:
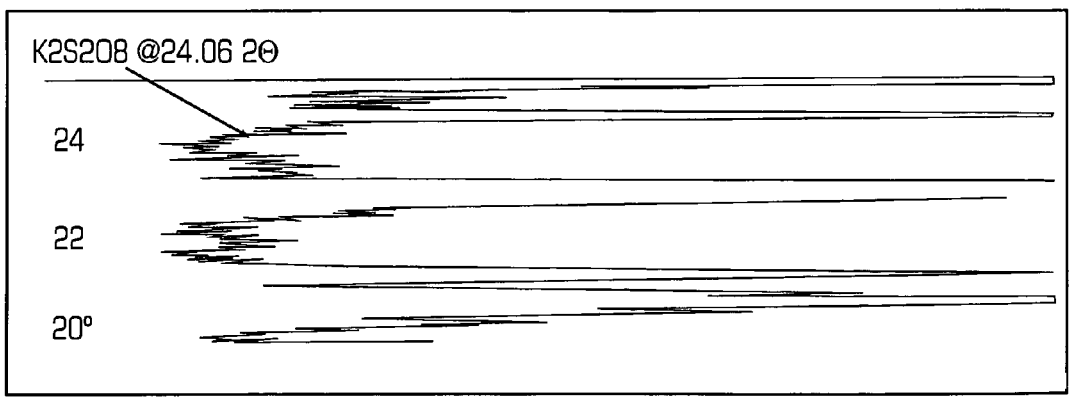
FIG. 7 is an X-Ray Diffraction Spectroscopy result of a potassium monpersulfate triple salt produced according to the methods of the invention.

FIG. 7 is an X-Ray Diffraction Spectroscopy result of the PMPS composition produced by using the process described above. The lack of the characteristic $K_2S_2O_8$ peak illustrates that the triple salt is free of detectable levels of $K_2S_2O_8$.

Potassium monopersulfate particles were coated with different materials, and tests were run to compare the properties of the resulting compositions. Some of the properties that were tested include hygroscopic tendencies (tendency to absorb water) and general stability.

Test 1

A series of tests were run to compare the hygroscopic characteristics of the coated PMPS since moisture penetration of the coating and subsequent adsorption and/or absorption of the moisture by the PMPS reduces PMPS stability and accelerates decomposition. Coating materials that were used for the test samples include polymaleic acid (PMA), sodium metasilicate, and chitosan.

The samples were placed in open plastic bags and exposed to the conditions illustrated in Table 1. After several hours of exposure with periodic mixing of the bags' contents, the fluidity and clumping characteristics were observed and noted.

TABLE 1

Effect of Coating Material Selection on PMPS Hygrophobicity

| Coated PMPS | Humidity at 80° F. | Observations |
| --- | --- | --- |
| PMPS coated with 2.5-wt % PMA | 80% | clumping |
| PMPS coated with 2.5-wt % Chitosan | 80% | free flowing |
| PMPS coated with 2.5-wt % PMA, 1.5-wt % Chitosan | 80% | free flowing |
| PMPS coated with 3.5-wt % Metasilicate | 80% | severe clumping |
| PMPS coated with 2.0% metasilicate, 1.5 wt % Chitosan | 80% | free flowing |

The results illustrated that the chitosan-coated compositions exhibit superior hygroscopic characteristics compared to some of the traditional coatings utilized and described in the prior art.

FIGS. 8A through 17 show scanning electron microscope (SEM) images of PMPS triple salt coated with various materials. The different surface patterns of the coatings may partially explain the different results achieved with the different coatings.

Figure 9:
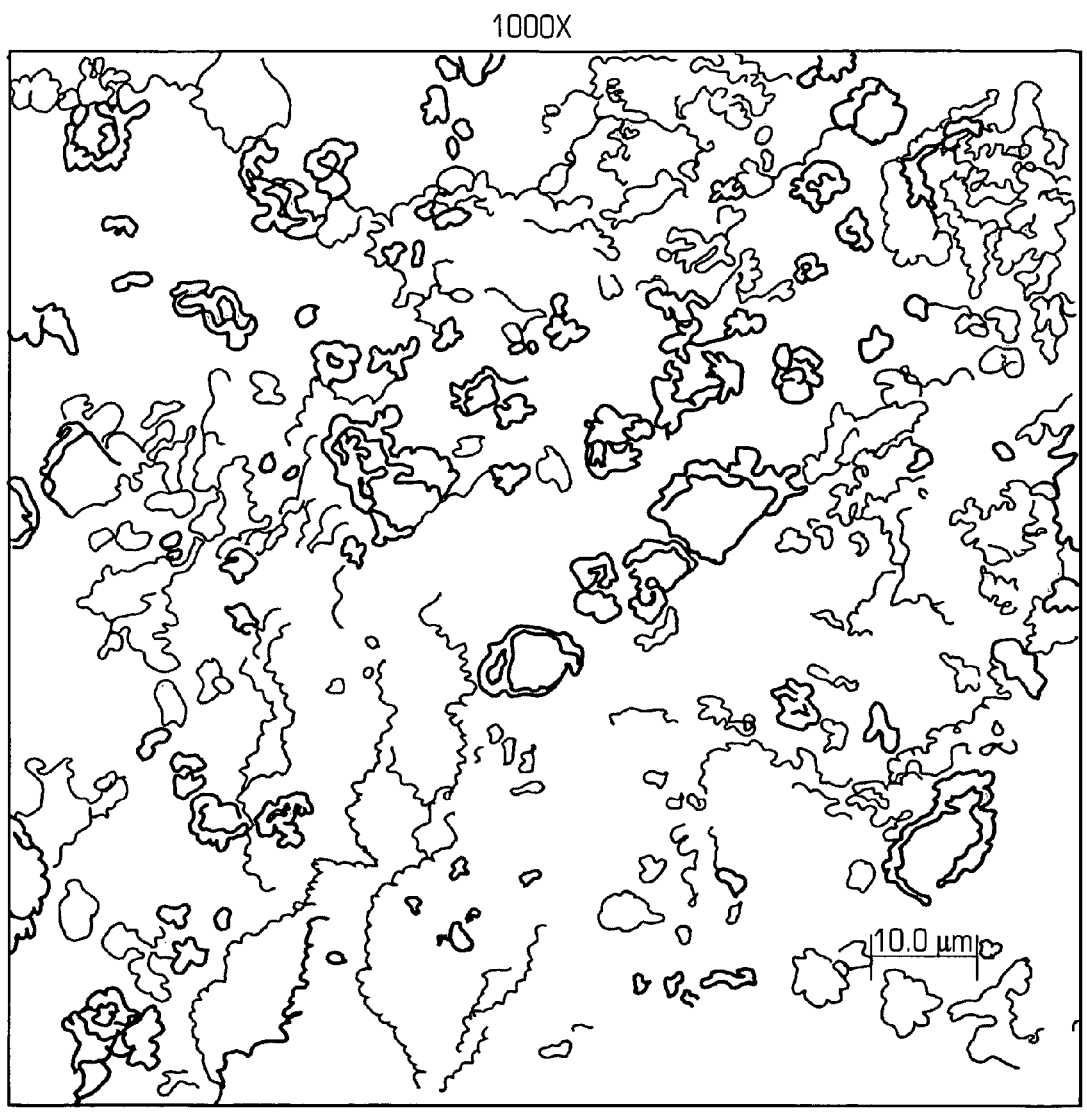
FIG. 9 is a 1000× magnification of the image of FIG. 8B showing the porosity of the PMPS triple salt.

FIG. 8B shows PMPS triple salt coated with $MgCO_3$ and FIG. 8A shows the analysis result of the image in FIG. 8B. FIG. 9 is a 1000× magnification of the image of FIG. 8B, and shows the porosity of the PMPS triple salt.

Figure 10:
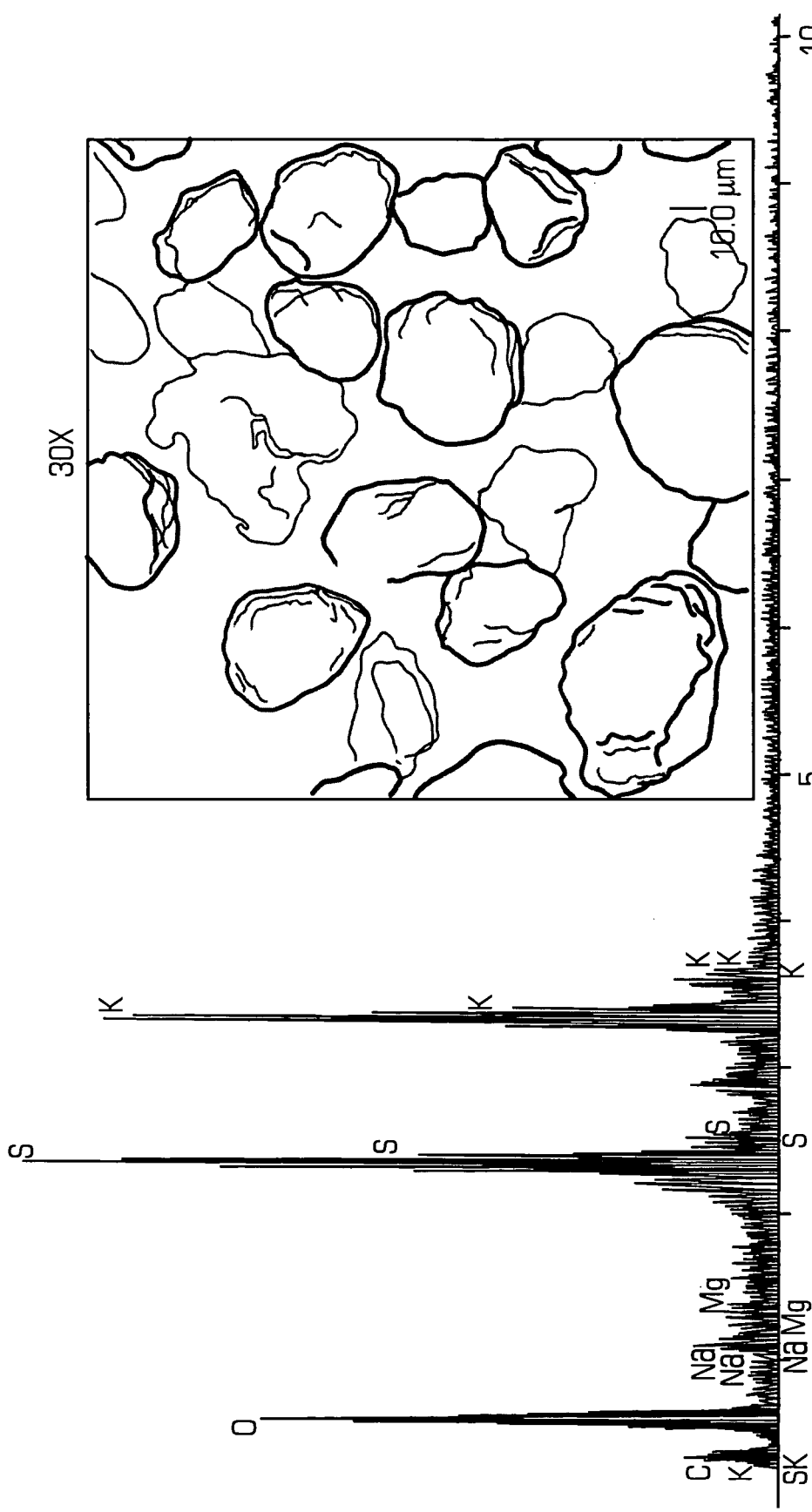
FIG. 10 is an SEM image of chitosan-coated PMPS triple salt.
Figure 11A:
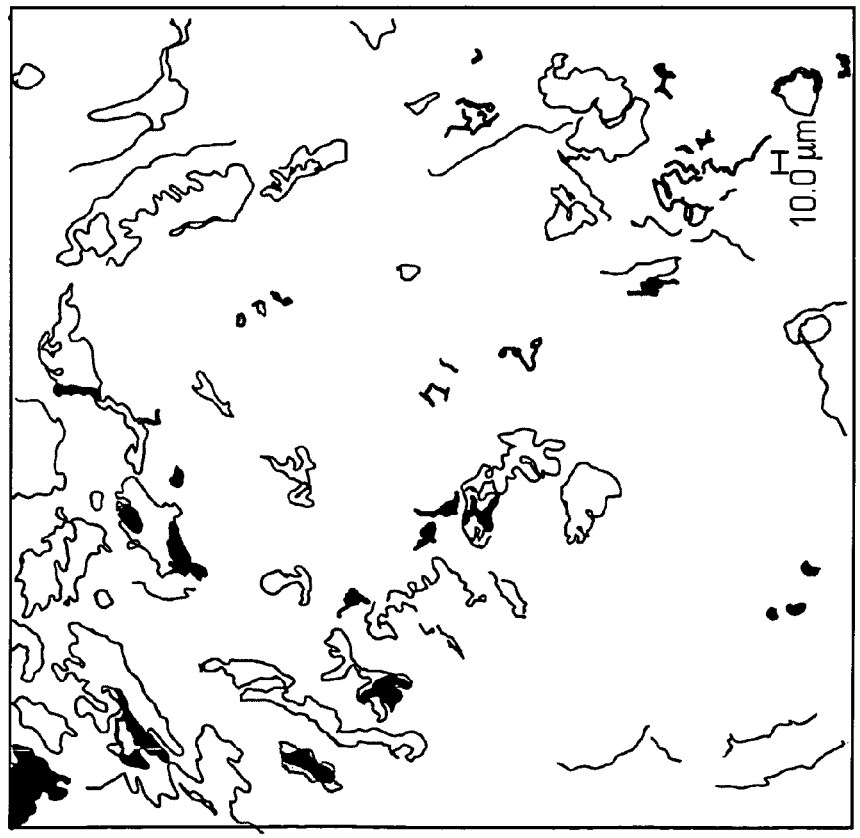
FIGS. 11A and 11B are 300× and 1000× magnifications of the image of FIG. 10.
Figure 11B:
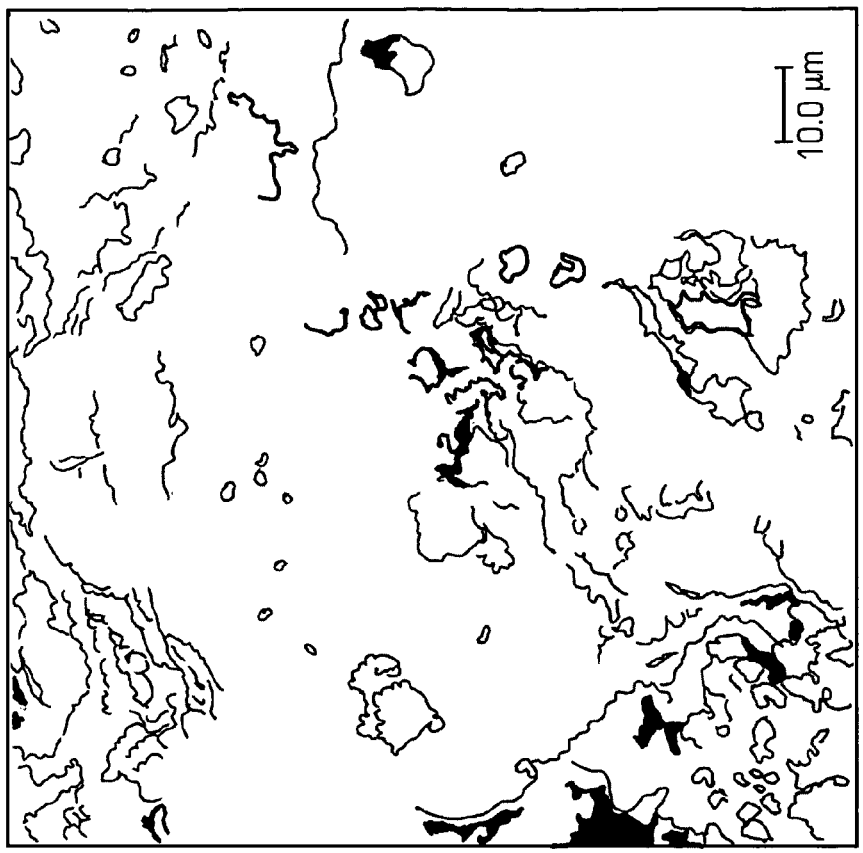
Figure 12:
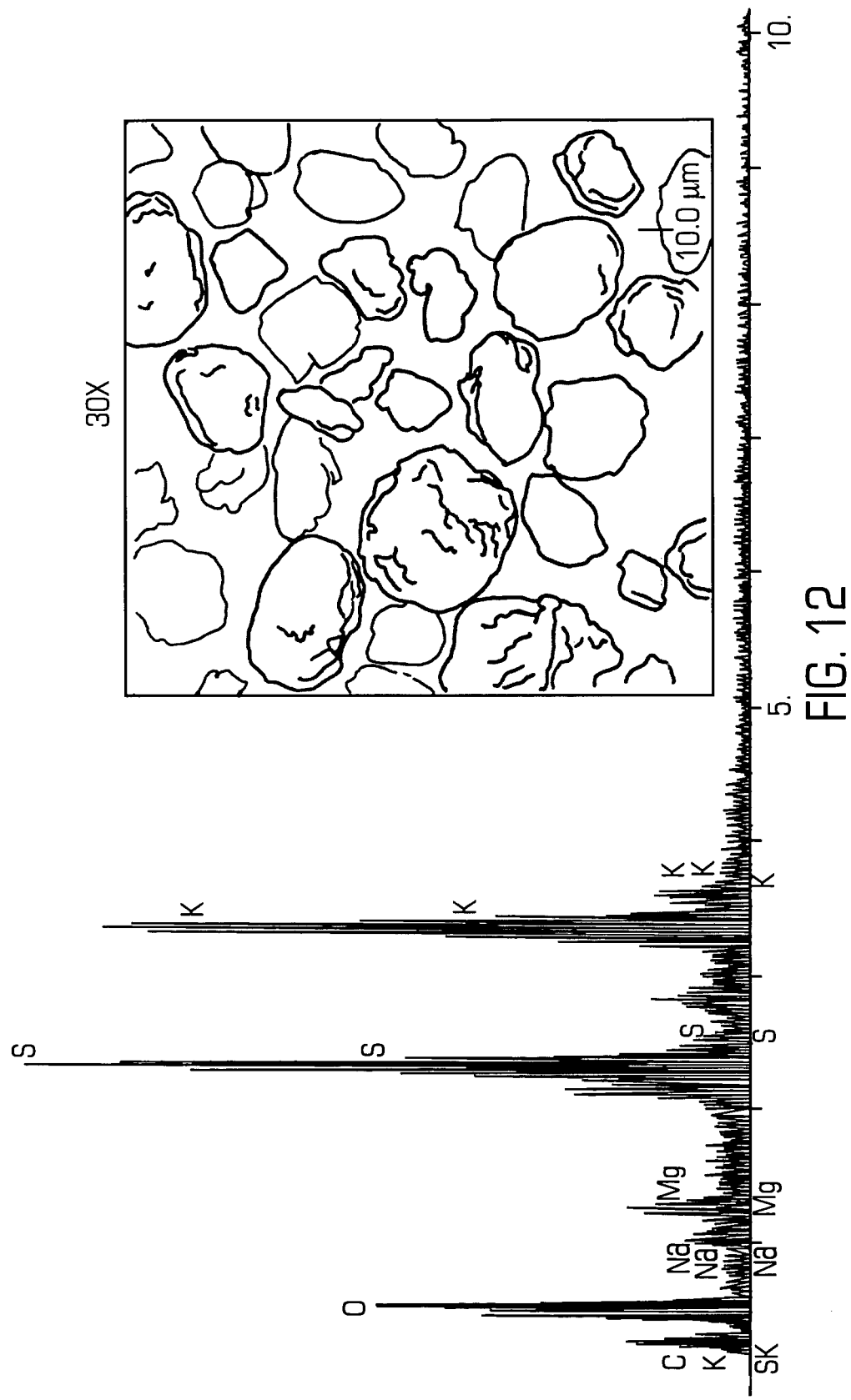
FIG. 12 is an SEM image of PMPS triple salt coated with polymaleic acid and chitosan and the analysis result of the image.

FIG. 10 is an SEM image of chitosan-coated PMPS triple salt. FIGS. 11A and 11B are 300× and 1000× magnifications of the image of FIG. 10, and shows the surface porosity.

Figure 13:
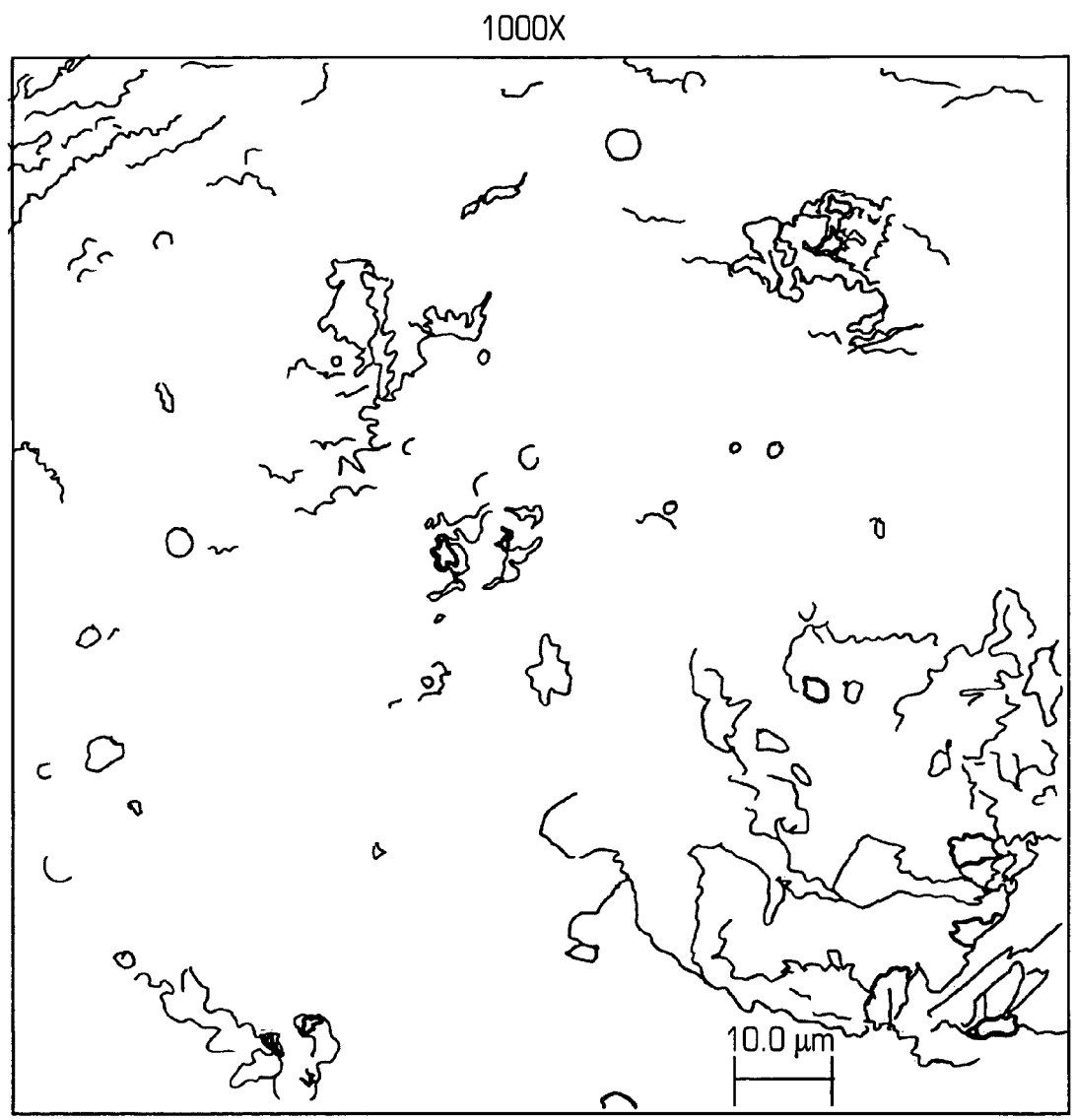
FIG. 13 is a 1000× magnification of the image of FIG. 12B.

FIG. 12B is an SEM image of a PMPS triple salt coated with polymaleic acid and chitosan, and FIG. 12A is the analysis result of the image in FIG. 12B. FIG. 13 is a 1000× magnification of the image of FIG. 12B, and shows that the surface is sealed.

Figure 14B:
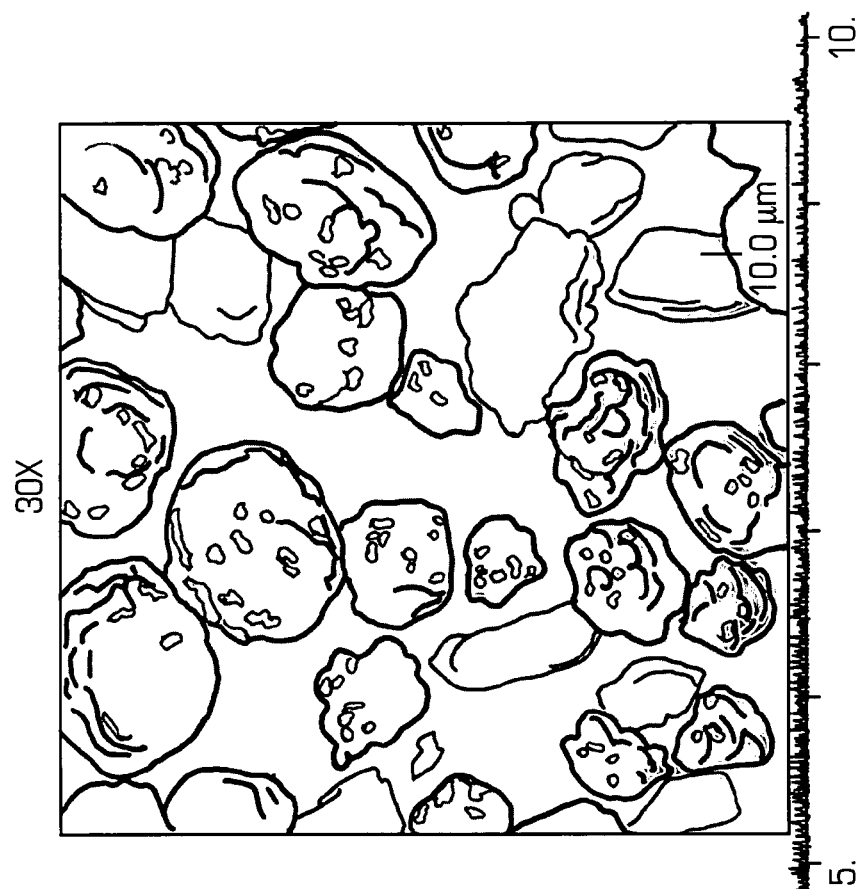
FIG. 14A and FIG. 14B are an SEM image and an SEM image analysis result of PMPS triple salt coated with metasilicate.
Figure 14A:
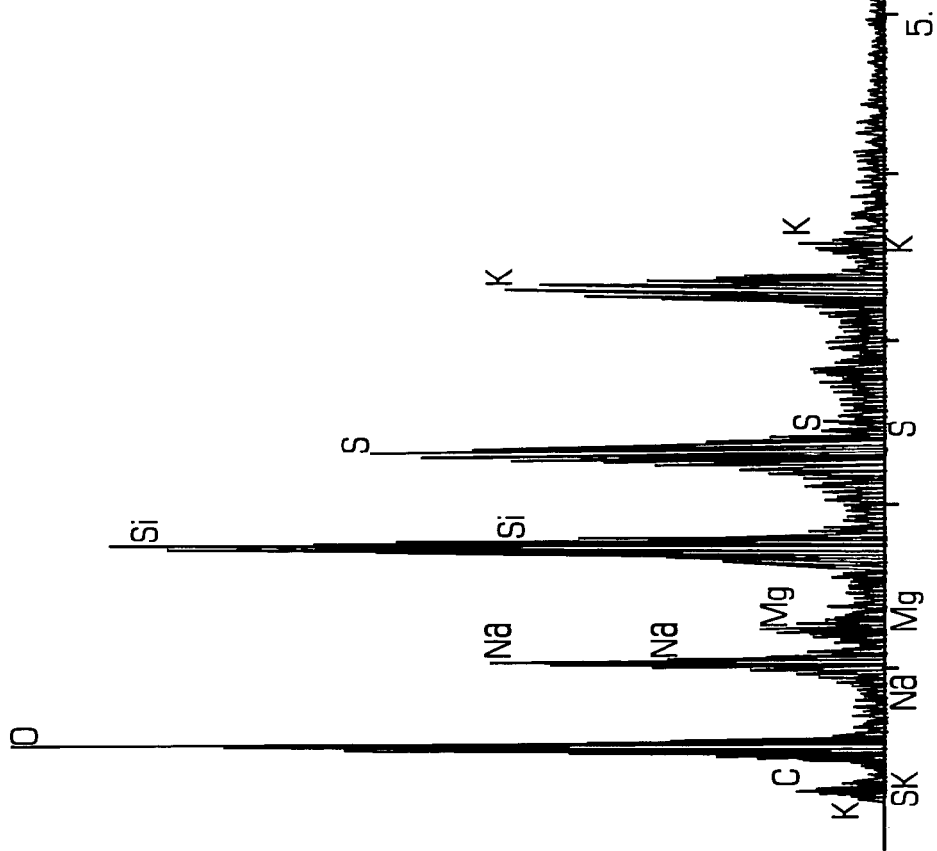
Figure 15:
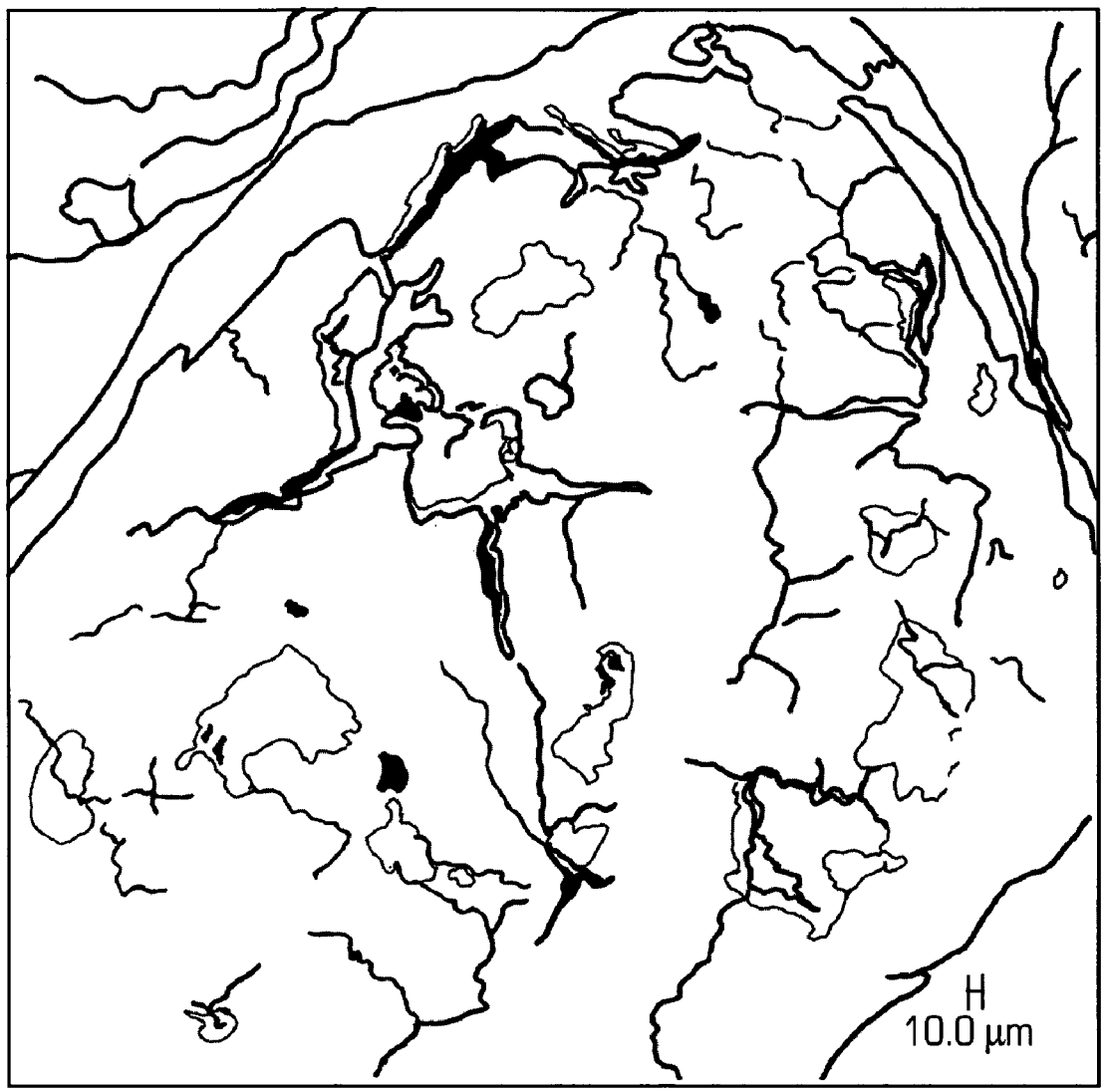
FIG. 15 is a magnified image of FIG. 14B.

FIG. 14A and FIG. 14B are an SEM image and an SEM image analysis result of PMPS triple salt coated with metasilicate. FIG. 15 is a magnified image of FIG. 14B, and shows the crack on the surface that allows exposure of the triple salt.

Figure 16B:
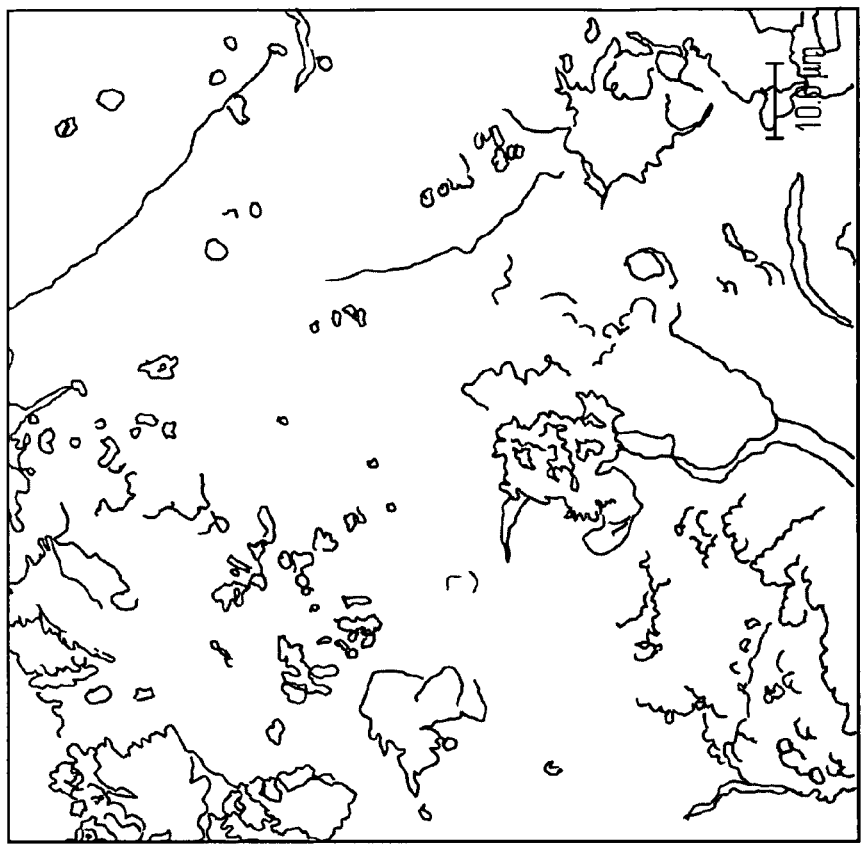
FIGS. 16A and 16B are 300× and 1000× magnifications of a PMPS triple salt coated with silicate and chitosan.
Figure 16A:
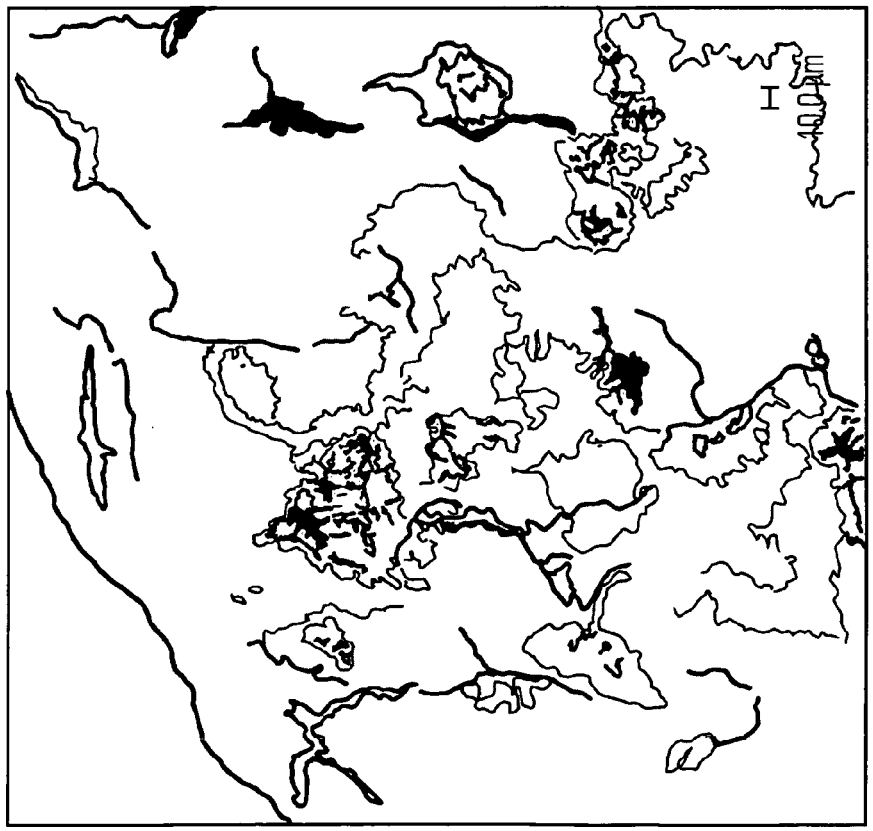

FIG. 16A and 16B are 300× and 1000× magnifications of a PMPS triple salt coated with silicate and chitosan.

Figure 17:
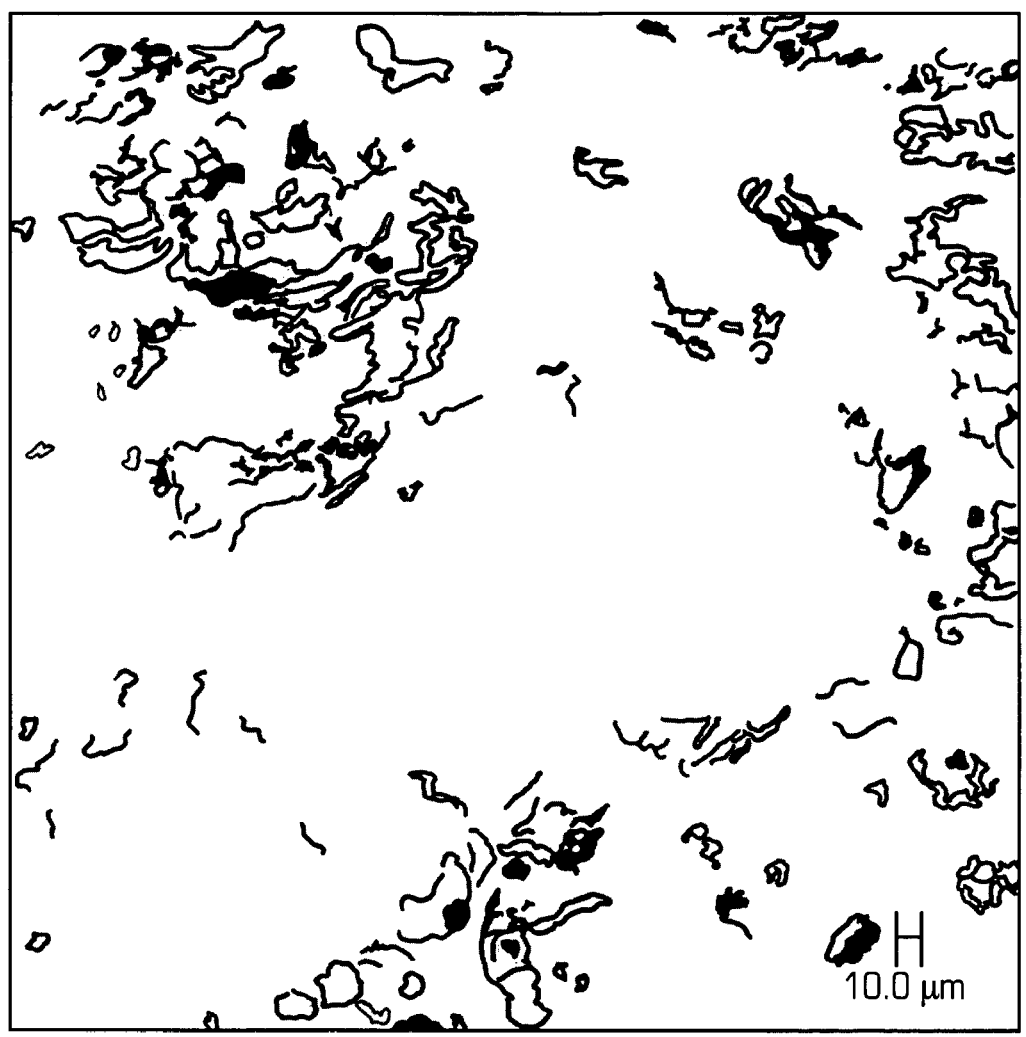
FIG. 17 is a 300× magnified image of PMPS triple salt coated with a silicate-polymer layer.

FIG. 17 is a 300× magnified image of PMPS triple salt coated with a silicate-polymer layer. The silicate-polymer coating shows improved uniformity relative to some of the other coatings.

Test 2

Another series of tests were run to compare the stability of potassium monopersulfate particles coated with different materials. Unlike in Test 1, where humidity was the only environmental factor the samples were exposed to, the samples in Test 2 were exposed to various common substances that the composition of the environment would be exposed to if incorporated into household products.

Weighed dry samples of the various PMPS compositions were prepared and tested for their available oxygen content (A.O.). Some dry samples were stored in open bags and other dry samples were mixed with additives with which the composition would be formulated for commercial use.

Testing for A.O. employed standard iodometric methods using thiosulfate titration. The dry samples were added to weighed amounts of deionized water and mixed until dissolved. A weighed sample of the solution was then added to a second weighed amount of deionized water, achieving serial dilution. Serial dilution was employed to dilute the composition while enhancing the stability of the released oxidant. All results were rounded to the nearest tenth.

In the case of the chitosan coated compositions, initial test showed that the measured A.O. was substantially higher when compared to uncoated PMPS samples.

Because there was some suspicion that the presence of PMPS interfered with A.O. measurements, samples were prepared using trisodium phosphate granules instead of PMPS particles. The trisodium phosphate granules were weighed and coated with an equivalent wt. % of chitosan using the fluidized drier method described above. The obtained samples were tested using the iodometric method.

Tests confirmed that substances in the coating material such as the PMPS or the acetic acid interfered with the A.O. measurements. The results of the test were used to provide a correction factor necessary to eliminate the bias imposed by the coating material. The corrected values are indicated by an asterisk (*).

TABLE 2

Effect of Coating Material Selection on PMPS Stability

| PMPS Description | Environmental element | Lapsed time | General Conditions | A.O. as wt % PMPS |
| --- | --- | --- | --- | --- |
| PMPS | N/A | 0 days | N/A | 6.4 |
| PMPS/2.5 wt % Chitosan | N/A | 0 days | N/A | *6.2 |
| PMPS/3.5 wt % metasilicate | N/A | 0 days | N/A | 6.1 |
| PMPS/2.5 wt % Chitosan | N/A | 17 days | 50-85% Humidity @ 72-85° F. | *6.2 |
| PMPS/2.5 wt % Chitosan | Powdered Tide Detergent | 17 days | 50-85% Humidity @ 72-85° F. | *6.3 |
| PMPS/3.5 wt % metasilicate | N/A | 17 days | 50-85% Humidity @ 72-85° F. | 5.5 |
| PMPS/3.5 wt % metasilicate | Powdered Tide Detergent | 17 days | 50-85% Humidity @ 72-85° F. | 4.3 |

A comparison of A.O. levels after 17 days of exposure to environmental elements shows that the chitosan-coated composition exhibits a good barrier film protection from environmental exposure. The chitosan-coated PMPS maintained a substantially constant A.O. level for 17 days. In contrast, the A.O. levels of the metasilicate-coated PMPS compositions dropped significantly after 17 days of exposure only to the general environmental conditions (humidity), and even more significantly where the PMPS composition was exposed to the Tide® detergent.

Test 3

A third series of tests were run to compare the effect of uncoated PMPS against the effect of coated PMPS when used in shock treatments for cleaning water systems. A shock treatment entails periodically adding a given amount of the cleaning composition (e.g., a PMPS composition) to a water system (e.g., a swimming pool, a spa, a hot tub). The periodic shock treatment is intended to maintain the active oxygen content (A.O.) of the treated water high to reduce the chemical oxygen demand (COD) more effectively. The COD usually results from wastes and contaminants produced by users of the water system (e.g., bathers). A.O. levels of the water after the shock treatment are shown in Table 3:

TABLE 3

Effect of Coated PMPS in Shock Treatment

| PMPS Description | Composition | A.O. as wt % PMPS (KI Indicator) |
| --- | --- | --- |
| PMPS | N/A | 6.4 |
| PMPS/2.5 wt % Chitosan | N/A | 8.0 |

Generally, a high A.O. indicates that the water is cleaner and more sanitary because the high A.O. enables the water to reduce the COD. As shown in Table 3, two samples of PMPS solution where prepared: one using untreated PMPS, and another one coated with chitosan. The chitosan is deposited on the PMPS by first being dissolved in a dilute acetic acid solution and then being applied using a fluidized drier and a spray atomizer. After the application, the chitosan solution is dried to form a layer of coating.

In each of the cases in Table 3, 0.56 grams of PMPS was dissolved in 99.44 grams H2O. A 25-ml sample of each solution was tested for A.O. using thiosulfate titration of the mixture that had been treated with an iodide indicator to produce a pink color. The intensity of the pink color is proportional to the detected oxidant concentration in the solution.

The test results illustrate the enhanced performance of the coated PMPS as it relates to affecting the solutions' ability to neutralize or consume chemical oxygen demand, indicated by the higher thiosulfate consumption.

Although potassium monopersulfate is used as the exemplary oxidizer in the above embodiments, this invention is applicable to various crystalline and/or homogeneous peroxygen and halogen oxidizers. Some oxidizers that may be used to implement the invention include:

1) inorganic peroxygen (e.g., percarbonate, perborate, calcium peroxide, magnesium peroxide);

2) organic peroxygen (e.g., peroxybenzoic acid, peroxy-α-naphthoic acid, peroxylauric acid, peroxystearic acid and diperoxy acids (such as; 1,12-diperoxydodecanedioic acid); and 3) halogen (e.g., trichloroisocyanuric, dichloroisocyanuric acids, calcium hypochlorite, and sodium bromide, Dibromodimethylhydantoin, Bromochlorodimethylhydantoin).

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. A stable oxidizer composition for use in formulations, the composition comprising: an multi-layer coated oxidizing particle comprising potassium monopersulfate in the form of a triple salt having the formula $2KHSO_5$—$KHSO_4$—$K_2SO_4$ wherein the triple salt comprises $K_2S_2O_8$ in an amount that is less than 0.5 wt. % of the triple salt; wherein said multi-layer coated oxidizing particle comprises a first inner layer comprising an inorganic salt deposited on said oxidizing particle; a second intermediate silicate-polymer layer or silicate layer which is different from said first inner layer; and outer organic polymer layer comprising a polysaccharide.

2. The composition of claim 1, wherein the potassium monopersulfate is in the form of a triple salt having the formula $2KHSO_5$—$KHSO_4$—$K_2SO_4$, and wherein about 43 to 75 wt. % of the triple salt is $KHSO_5$.

3. The composition of claim 1, wherein the K2S2O8 makes up less than 0.2 wt. % of the oxidizing particle.

4. The composition of claim 2, wherein the potassium monopersulfate is in the form of a triple salt having the formula $2KHSO_5$—$KHSO_4$—$K_2SO_4$, the triple salt comprising an alkali magnesium salt selected from the group consisting of $Mg(OH)_2$, $MgCO_3$, $Mg(HCO_3)_2$, MgO, $(MgCO_3)_4$—$Mg(OH)_2$-$5H_2O$, $CaMg(CO_3)_2$, MgO—CaO, $Ca(OH)_2$—MgO, and a combination thereof, wherein the alkali magnesium salt makes up no more than about 10 wt. % of the triple salt.

5. The composition of claim 1, wherein the organic polymer layer makes up about 0.1-10 wt. % of the composition.

6. The composition of claim 1, wherein the polysaccharide includes one or more of cellulose, dextran, pectin, alginic acid, agar, agarose, carragenans, chitin, and chitosan.

7. The composition of claim 1, wherein the organic polymer layer includes one or both of chitin and chitosan.

8. The composition of claim 7, where the chitin or chitosan is dissolved in a gel or liquid.

9. The composition of claim 1 wherein said second intermediate is a silicate layer and said silicate layer contains one of sodium silicate, potassium silicate, lithium silicate, magnesium silicate, calcium silicate, alkyl silicate, calcium borosilicate, alkyl borosilicate, or silicic acid.

10. The composition of claim 9, wherein the silicate layer makes up no more than 10 wt. % of the composition.

11. The composition of claim 1, wherein the organic polymer layer contains at least one of chitin and chitosan.

12. The composition of claim 1 wherein the second intermediate is a silicate-polymer layer that makes up no more than 10 wt. % of the composition.

13. The composition of claim 12, wherein the polymer component of said silicate-polymer layer comprises a copolymer or a tertiary polymer having a carboxylate component.

14. The composition of claim 13, wherein the carboxylate component is derived from one of polyacrylic acid, polymethacrylic acid, and polymaleic acid.

15. The composition of claim 12, wherein the polymer component of said silicate-polymer layer comprises a copolymer or a tertiary polymer having a sulfonate component.

16. The composition of claim 15, wherein the sulfonate component is derived from one of methacrylamido methyl propane sulfonic acid and styrene sulfonic acid.

17. The composition of claim 13, wherein the tertiary polymer comprises a nonionic component.

18. The composition of claim 17, wherein the nonionic component is selected from a group consisting of methacrylamide, substituted methacrylamide, vinyl alcohol, allyl alcohol, vinyl esters, an ester of vinyl or allyl alcohol, styrene, isobutylene and diisobutylene.

19. The composition of claim 1, wherein the outer organic polymer layer comprises a first polymer layer and a second polymer layer.

20. The composition of claim 19, wherein the first polymer layer is selected from one of polymaleic acid, phosphinocarboxylic acid, polycarboxylic acid, polyepoxysuccinic acid polycarboxylic acid, and polyacrylic acid.

21. The composition of claim 19, wherein the first polymer layer comprises one of sodium, potassium, lithium, calcium, and magnesium.

22. The composition of claim 20, wherein the second polymer layer is a polysaccharide.

23. The composition of claim 22, wherein the polysaccharide is one or more of cellulose, dextran, pectin, alginic acid, agar, agarose, carragenans, chitin, and chitosan.

24. The composition of claim 21, wherein the second polymer layer contains one or both of chitin and chitosan.

25. The composition of claim 24, wherein the chitin or chitosan is applied to the oxidizing particle in the form of a liquid, gel, or a foam.

26. A method of preparing an oxidizing composition, the method comprising: providing a multi-layer coated oxidizing particle comprising potassium monopersulfate in the form of a triple salt having the formula: $2KHSO_5$—$KHSO_4$—$K_2SO_4$ wherein the triple salt comprises $K_2S_2O_8$ in an amount that is less than 0.5 wt. % of the triple salt; and wherein said multi-layer coated oxidizing particle is prepared by depositing a first inner layer comprising an inorganic salt on said oxidizing particle; depositing a second intermediate silicate-polymer layer or silicate layer which is different from said first inner layer; and depositing an outer organic polymer layer comprising a polysaccharide.

27. The method of claim 26, wherein the oxidizing particle is a potassium monopersulfate triple salt having the formula $2KHSO_5$—$KHSO_4$—$K_2SO_4$, wherein $KHSO_5$, is present in an amount that makes up about 43 to 75 wt. % of the triple salt.

28. The method of claim 26, wherein the oxidizing particle is a potassium monopersulfate triple salt having the formula $2KHSO_5$—$KHSO_4$—$K_2SO_4$, wherein the triple salt comprises an alkali magnesium salt selected from a group consisting of $Mg(OH)_2$, $MgCO_3$, $Mg(HCO_3)_2$, $MgO$, $(MgCO_3)_4$—$Mg(OH)_2$·$5H_2O$, $CaMg(CO_3)_2$, $MgO$—$CaO$, $Ca(OH)_2$—$MgO$, or a combinations thereof, and wherein the alkali magnesium salt makes up no more than about 10 wt. % of the triple salt.

29. The method of claim 26, wherein the outer organic polymer layer contains chitin or chitosan, which is applied by first dissolving a chitin or chitosan in a solvent to form a liquid, gel, or foam.

30. The method of claim 29 further comprising drying the organic polymer layer at a temperature no higher than 90° C.

31. A reduced allergenic potassium monopersulfate composition comprising: an multi-layer coated oxidizing particle comprising potassium monopersulfate in the form of a triple salt having the formula $2KHSO_5$—$KHSO_4$—$K_2SO_4$ wherein the triple salt comprises $K_2S_2O_8$ in an amount that is less than 0.5 wt. % of the triple salt; wherein said multi-layer coated oxidizing particle comprises a first inner layer comprising an inorganic salt deposited on said oxidizing particle; a second intermediate silicate-polymer layer or silicate layer which is different from said first inner layer; and an outer polysaccharide layer.

32. The composition of claim 31, wherein the polysaccharide layer comprises one or both of chitin and chitosan.

33. The composition of claim 32, wherein the chitosan layer comprises chitosan dissolved in a solvent such that chitosan forms no more than 10 wt. % of the chitosan layer.

34. The composition of claim 31 wherein said second intermediate is a silicate layer and said silicate layer contains one of sodium silicate, potassium silicate, lithium silicate, magnesium silicate, calcium silicate, alkyl silicate, calcium borosilicate, alkyl borosilicate, or silicic acid.

35. The composition of claim 34, wherein the silicate layer makes up no more than 10 wt. % of the composition.

36. The composition of claim 31 wherein the second intermediate is a silicate-polymer layer that makes up no more than 10 wt. % of the composition.

37. The composition of claim 31, wherein the polymer component of said silicate-polymer layer comprises a copolymer or a tertiary polymer having a carboxylate component.

38. The composition of claim 37, wherein the carboxylate component is derived from one of polyacrylic acid, polymethacrylic acid, and polymaleic acid.

39. The composition of claim 36, wherein the polymer component of said silicate-polymer layer comprises a copolymer or a tertiary polymer having a sulfonate component.

40. The composition of claim 39, wherein the sulfonate component is derived from one of methacrylamido methyl propane sulfonic acid and styrene sulfonic acid.

41. The composition of claim 39, wherein the tertiary polymer comprises a nonionic component.

42. The composition of claim 41, wherein the nonionic component is selected from a group consisting of methacrylamide, substituted methacrylamide, vinyl alcohol, allyl alcohol, vinyl esters, an ester of vinyl or allyl alcohol, styrene, isobutylene and diisobutylene.

43. A method of making a reduced allergenic potassium monopersulfate composition, the method comprising: preparing a multi-layer coated oxidizing particle comprising potassium monopersulfate in the form of a triple salt having the formula: $2KHSO_5$—$KHSO_4$—$K_2SO_4$ wherein the triple salt comprises $K_2S_2O_8$ in an amount that is less than 0.5 wt. % of the triple salt; and wherein said multi-layer coated oxidizing particle is prepared by depositing a first inner layer comprising an inorganic salt on said oxidizing particle; depositing a second intermediate silicate-polymer layer or silicate layer which is different from said first inner layer; and depositing an outer polysaccharide solution to produce a polysaccharide layer.

44. The method of claim 43, wherein preparing the polysaccharide solution comprises dissolving one of chitin or chitosan in a solvent.

* * * * *